Patented Jan. 19, 1932

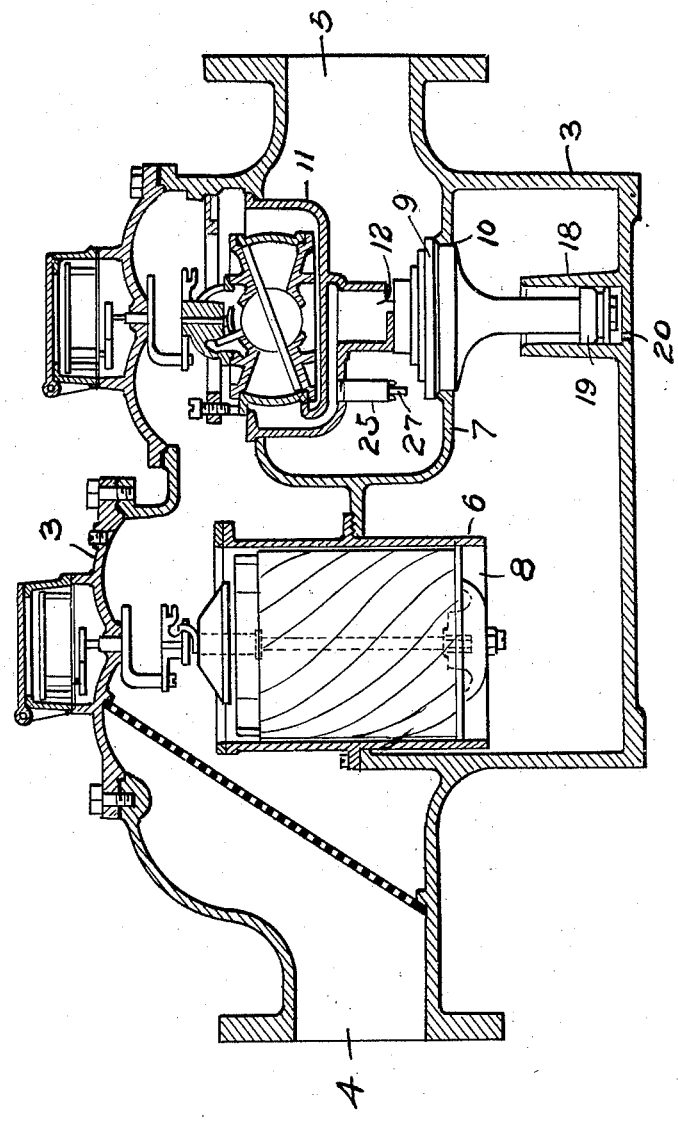

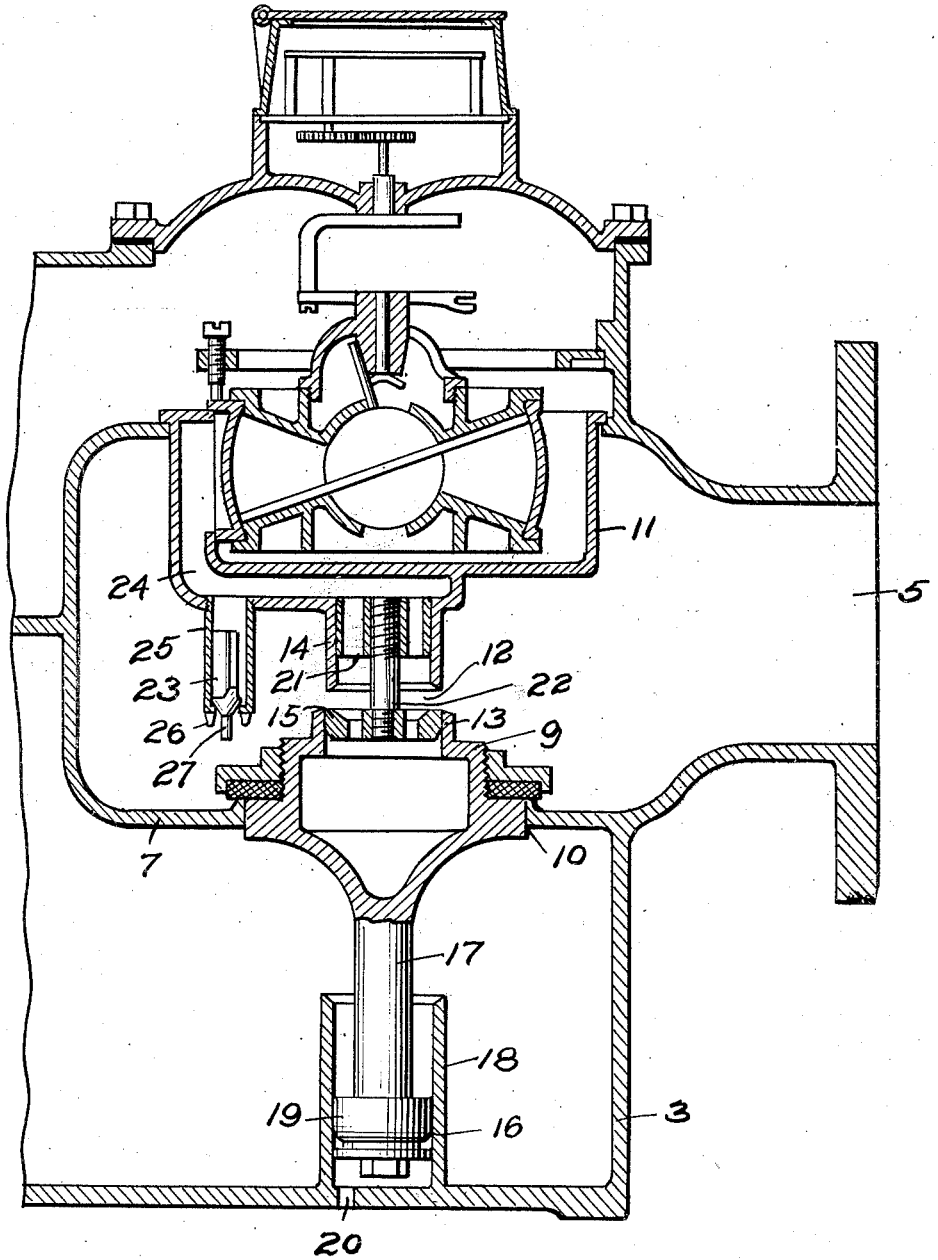

1,842,267

UNITED STATES PATENT OFFICE

ABRAM G. HOLMES, OF PITTSBURGH, PENNSYLVANIA, ASSIGNOR, BY MESNE ASSIGNMENTS, TO PITTSBURGH EQUITABLE METER COMPANY, OF PITTSBURGH, PENNSYLVANIA, A CORPORATION OF PENNSYLVANIA

COMPOUND METER

Application filed March 7, 1922. Serial No. 541,682.

This invention relates to compound meters; that is, to meters including separate metering mechanisms which are effective under different conditions of flow of the metered fluid.

An object of the invention is to produce improved means for controlling the flow of metered fluid through the metering mechanisms whereby the apparatus is rendered more effective and accurate in operation.

A further object is to produce a compound meter provided with improved means for controlling the flow of fluid to be metered through the different metering mechanisms thereof, so that the mechanism adapted to meter the large flows is subjected to the entire flow at the time of changing the flow from one metering mechanism to the other and the mechanism adapted to meter small flows operates on a restricted flow during substantially the entire period of operation of the other mechanism.

These and other objects which will be made more apparent throughout the further description of the invention are attained by means of apparatus embodying the features herein described and illustrated in the drawings accompanying and forming a part hereof.

In the drawings, Figure 1 is a diagrammatic sectional view illustrating a compound meter embodying my invention.

Figure 2 is a fragmental sectional view on an enlarged scale of a portion of the meter shown in Fig. 1.

In compound meters, two metering mechanisms are ordinarily employed and they are so arranged that the fluid to be metered passes through one or the other of the mechanisms depending upon the rate or volume of fluid flow. It is usual practice to provide a metering mechanism for large flows and a metering mechanism for small flows and also to provide automatic means for shifting the flow from one mechanism to the other in response to predetermined variations in flow.

In some cases, the flow through the small meter is wholly cut off at the time of shifting the flow to the larger meter, and the small meter remains inoperative as long as the larger metering mechanism is in operation. In other cases, the smaller meter is never wholly shut off and consequently continues to operate at all times or without restriction while the larger metering mechanism is in operation. Both of these arrangements are objectionable. Where the smaller meter is cut off and remains inoperative during the entire time that the larger mechanism is in operation, it is liable to become ineffective by sticking, due to the collection of sediment in its working mechanism passages. It is also objectional to so arrange the apparatus that the smaller meter is never entirely shut off, since under certain conditions the smaller meter must be of substantially zero capacity to insure an adequate flow through the larger mechanism to start and to operate the larger mechanism at the instant of shifting to that mechanism. While it is desirable to continue the operation of the smaller metering mechanism during the operation of the larger one, it is objectionable to operate the smaller mechanism on larger flows than are just necessary to keep its operating parts in motion, since the function of metering the flow is in effect imposed upon the larger mechanism and a substantial flow through the smaller mechanism merely increases the wear on that mechanism, thereby decreasing its life. One of the features of my present invention is that means are employed for maintaining a reduced flow through the small metering mechanism under conditions of large flow, but which is so arranged that the larger mechanism receives the entire existing flow at the time of assuming the function of metering the flow.

Referring to the drawings, the compound meter illustrated is provided with a casing 3 having an inlet port 4 and an outlet port 5. A metering mechanism 6 for large flows is located within the casing 3 with the inlet of its metering chamber in open communication with the inlet port 4. A partition 7 is located within the casing 3 and is so arranged that it intervenes between the delivery port 8 of the mechanism 6 and the outlet port 5. Communication between the ports 8 and 5 is controlled by means of a pressure-responsive valve 9 which controls a port 10 in the partition 7. A metering mechanism 11 for metering small flows is also contained within the casing 3 and is located so that the inlet to its metering chamber is always in open communication with the inlet port 4. The delivery port 12 of this metering chamber is located on the port 5 side of the partition 7 and the latter is so formed and positioned with relation to the casings of the two mechanisms that fluid cannot pass through one meter after it has passed through the other.

The valve 9 is so located and arranged with relation to the discharge port 12 of the meter mechanism 11, that it closes the discharge port 12 as it opens the port 10. As shown in the drawings, the valve 9 is of the combined disk and piston type insofar as its control of the port 10 is concerned, and it is provided with a sleeve 13 which is adapted to telescope with an annular flange 14 surrounding the port 12 and thereby close that port. As shown, the valve 9 is guided in its operation by a guide 15 carried by the flange 14 and a plunger 16 mounted on the valve stem 17 and operating in a cylinder or extension 18 which as shown is formed on the casing 3 and projects into the discharge passage of the metering mechanism 8. It will, of course, be understood that the cylindrical flange 14, the port 10 and the cylinder 18 are preferably axially aligned. The valve stem 17 is also provided with a cup washer 19 which snugly fits the inner wall of the cylinder 18 for the purpose of preventing leakage from the interior of the casing 3 through an atmospheric port 20 with which the cylinder is provided. As shown, the guide 15 is supported by the flange 14 through the agency of a spider 21 and a stud 22.

Under small flow conditions, the valve 9 is retained in its lower position, in which the port 10 is closed and the port 12 is fully open. Under such conditions, all the fluid traversing the meter must pass through the metering chamber of the mechanism 11. Variations in flow of the metered fluid are in response to or occasion variations in fluid pressure in the discharge passages of the meter and the areas of the valve 9 exposed on opposite sides of the partition 7 and to atmospheric pressure within the cylinder 18 are so proportioned that the valve will move in response to variations in pressure within the discharge passage immediately communicating with the outlet port 5.

After a predetermined flow is reached, the valve 9, moving in response to the preponderating pressure below the partition 7, lifts the disk portion off the seat formed on the partition 7 and, as the drop in pressure within the discharging passages of the meter continues, the valve moves upwardly and finally opens the port 10 by withdrawing the cylindrical portion of the valve out of closing relation with the port. The sleeve 13 is so formed and positioned with relation to the flange 14, the port 10 and the piston portion of the valve 9, that the port 12 is closed as the port 10 is opened. This renders the mechanism 11 ineffective and the mechanism 6 effective. In order to prevent the mechanism 11 from standing idle during long periods of the large flow, I provide means for by-passing the port 12 and for maintaining a small flow through the working passages of the mechanism 11 after the port 12 is closed. As shown, I have provided a by-pass valve 23 in the discharge passage 24 of the mechanism 11 at a point between the inlet end of that passage and the port 12. The valve 23 is located within a cylindrical casing 25 which is in open communication with the passage 24 and which is provided at its lower end with a port 26 opening into the discharge passage or chamber of the casing 3. The valve 23 controls this port and, as shown, is provided with a stem 27 which projects therethrough and is so located and positioned that it is adapted to be engaged by the valve 9 immediately after that valve has moved upwardly and opened the port 10 and closed the port 12. The valve 23 will therefore open immediately after the port 12 is closed and will permit a just sufficient flow through the mechanism 11 to ensure a continuous movement of its operating parts. The casing 25 is also so located and arranged that it forms a stop for the valve 9 and therefore limits its travel in one direction and prevents damage to the port closing edge of the sleeve 13. From the foregoing, it will be apparent that the valve 23 opens immediately after the valve 12 is closed and thereby permits a limited flow of fluid to pass through the metering mechanism 11, whereas all the rest of the fluid traverses the metering passages of the mechanism 6.

It will thus be seen that a single port 10 is disposed in the passage in which the large flow meter is disposed, and that discharge from the passage in which the small flow meter is arranged takes place through ports 12 and 26, and that valve means, consisting of valve 9, sleeve 13, and valve 23, all of which move in response to pressure conditions in the outlet 5, controls the flow through said ports in the manner above described.

My invention minimizes the cost of the meter since there is no necessity for employing a metering mechanism 11, having a capacity in excess of the minimum capacity of the larger mechanism. It also ensures effective and accurate operation of both metering mechanisms and minimizes the wear on the smaller mechanism and the register and indicating mechanism operated thereby.

While I have illustrated and described but one embodiment of my invention, it will be apparent that various changes, modifications, additions and omissions may be made in the apparatus illustrated without departing from the spirit and scope of the invention as set forth by the appended claims.

I claim as my invention:

1. In combination in a compound meter, a metering mechanism for large flows of fluid to be metered, a metering mechanism for small flows of fluid to be metered, each having an outlet port communicating with a common discharge passage, and said small metering mechanism having a restricted by-pass around the outlet port thereof, a valve responsive to pressure within said passage for simultaneously closing communication between the outlet port of one mechanism and establishing communication between the outlet port of the other mechanism and said discharge passage, and a normally closed valve for establishing communication between said by-pass and said discharge passage after the outlet port of said mechanism for small flows is closed.

2. In combination in a compound meter, two metering mechanisms, a valve structure for simultaneously closing the exhaust port of one mechanism and opening the exhaust port of the other, pressure-responsive means for operating said valve to close one or the other of said exhaust ports there being a restricted by-pass around the exhaust port of one mechanism, a normally-closed valve in said by-pass, said valve structure including means to open said by-pass after said first-mentioned means has operated to close the associated exhaust port.

3. In combination in a compound meter, a metering mechanism for large flows of fluid to be metered, a metering mechanism for small flows of fluid to be metered, flow responsive means for diverting the flow of fluid from one to the other of said mechanisms, and normally closed means operated by said first mentioned means for establishing a limited flow of fluid through the mechanism for small flows after the flow of fluid has been diverted therefrom to the other mechanism.

4. In combination in a compound meter, a metering mechanism for large flows of fluid to be metered, a metering mechanism for small flows of fluid to be metered, flow responsive means for simultaneously cutting off the flow through said small flow mechanism and establishing the flow through said large flow mechanism, there being a restricted by-pass communicating with the small flow mechanism, and a normally closed valve in said by-pass opened by said means to establish a limited flow of fluid through said small flow mechanism after said means has operated to cut off the flow therethrough.

5. In combination in a compound meter, a metering mechanism for large flows of fluid to be metered, a metering mechanism for small flows of fluid to be metered, each having an outlet port communicating with a common discharge passage, a flow responsive valve for simultaneously closing off communication between the outlet port of one mechanism and establishing communication between the outlet port of the other mechanism and said discharge passage, there being a restricted by-pass passage for by-passing the outlet port of the small flow meter, and a normally closed valve in said by-pass passage actuated by said flow responsive means to open said by-pass passage after said flow responsive means has operated to close the outlet port of the small flow mechanism.

6. In combination in a compound meter, a large metering mechanism for large flows of fluid to be metered, a small metering mechanism for small flows of fluid to be metered, a flow responsive cutting-off device for severing communication between the discharge of one or the other of said mechanisms and the outlet port of the meter, ported means providing a by-pass around the normal outlet of the small metering mechanism, and valve means controlling said port and operated by said device for establishing a limited flow of fluid through the smaller mechanism after the cutting-off device has been operated to close the discharge of the smaller mechanism.

7. In combination in a compound meter, a large metering mechanism for large flows of fluid to be metered, a small metering mechanism for small flows of fluid to be metered, a flow responsive device for cutting off the flow through one or the other of said mechanisms and simultaneously diverting the flow to the other, and a by-pass valve, actuated by said device after the flow through the smaller mechanism has been cut off, for maintaining a limited flow of fluid through the smaller mechanism.

8. In combination, in a compound meter, a meter casing having a fluid inlet port and a fluid outlet port, a metering mechanism for large flows of fluid to be metered located within said casing and having an inlet port in open communication with said fluid inlet port and an outlet port, a meterng mechanism for small flows of fluid to be metered having an inlet port in open communication with said fluid inlet port, an outlet port, and a by-pass around said latter outlet port, a normally closed valve located in said by-pass, a single valve for simultaneously establishing communication between one of said outlet ports and cutting off communication between the other of said ports and said fluid outlet port, and means responsive to the flow of fluid through said casing for actuating said valve and for opening said normally closed valve when the outlet port associated therewith is closed.

9. In combination, in a compound meter, a meter casing having an inlet port and an outlet port, two metering mechanisms located within said casing, each having an inlet port communicating with the inlet port of said casing, and an outlet port adapted to communicate with the outlet port of said casing, and one having a restricted by-pass communicating with the outlet port of said casing, means for simultaneously closing the exhaust port of one of said mechanisms and opening the exhaust port of the other, and a normally closed valve in said by-pass operated by said means to open said by-pass when the outlet port associated therewith is closed.

10. A compound meter comprising a casing having an inlet and an outlet, a pair of passages formed in said casing between said inlet and outlet, a large flow metering mechanism in one of said passages, a small flow metering mechanism in the other of said passages, a wall of the passage for said small flow meter including a pair of discharge ports, a wall of said other passage having a single discharge port, and valve means responsive to changes in pressure in said outlet to control the flow through said mechanisms and said ports, said valve means being arranged to momentarily close both of said ports when the flow is shifted to the large flow meter and to then open one of said ports.

11. A compound meter comprising a casing having an inlet and an outlet, partitions in said casing providing a passage between said inlet and outlet having a single port discharging in said outlet, and a second passage having a pair of ports discharging in said outlet, a metering mechanism in each of said passages, and valve means arranged to control the flow through said passages and metering mechanisms in accordance with pressure conditions in said outlet by closing certain of said ports, said valve means operating to momentarily close said pair of ports from one of said passages when said means opens said single port in the other passage and to then open one of said pair of ports.

In testimony whereof, I have hereunto subscribed my name this 3d day of March, 1922.

ABRAM G. HOLMES.